(No Model.)
E. A. SPERRY.
ELECTRIC RAILWAY TROLLEY.
No. 501,968. Patented July 25, 1893.
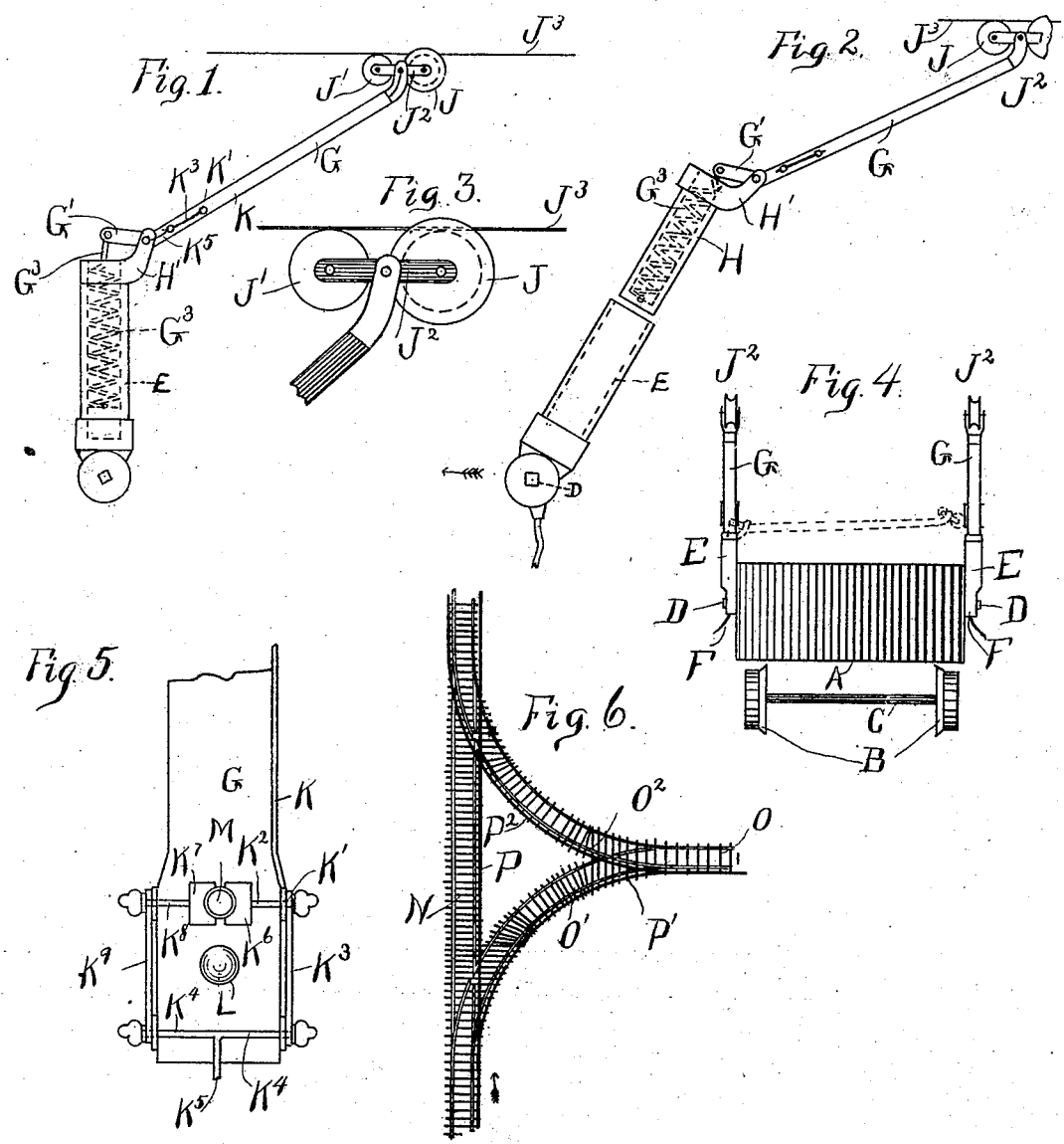

United States Patent Office.

ELMER A. SPERRY, OF CHICAGO, ILLINOIS, ASSIGNOR TO THE SPERRY ELECTRIC RAILWAY COMPANY, OF CLEVELAND, OHIO.

ELECTRIC-RAILWAY TROLLEY.

SPECIFICATION forming part of Letters Patent No. 501,968, dated July 25, 1893.

Application filed April 1, 1892. Serial No. 427,384. (No model.)

*To all whom it may concern:*

Be it known that I, ELMER A. SPERRY, a citizen of the United States, residing at Chicago, in the county of Cook and State of Illinois, have invented a new and useful Improvement in Trolleys, of which the following is a specification.

My invention relates to trolleys and poles for cars, especially such as are used in mining, and has for its object to provide a cheap, simple and convenient means for conducting the current from a trolley wire to the motor on the car. It is illustrated in the accompanying drawings, wherein—

Figure 1 is a side view of a trolley pole in operation. Fig. 2 is a similar view with the pole detachment socket. Fig. 3 is a detail of the trolley proper. Fig. 4 is an end view of the car, showing the two poles. Fig. 5 is a detail of the pole and safety fuses. Fig. 6 is a plan view of tracks and trolleys, showing the use of the two poles.

Like parts are indicated by the same letter in all the figures.

A is the body of the car; B B the wheels on the axle C. Pivoted to the bolts D D to the sides of the car are the trolley pole sockets E E, from which lead the conductors F F to their proper connections. These sockets are held in an upright position by frictional contact with the sides of the car, and each socket is provided with a plunger H, having an upper arm H′, to which is pivoted the lower end of the trolley pole G. The end, G′, of this trolley pole is connected with the spring $G^3$, within the plunger H. The trolley pole carries at its upper end the grooved trolley J, and the smooth trolley J′ on opposite ends of a pivoted bar, $J^2$, and both of the trolleys normally bear upon the trolley wire $J^3$. Toward the lower end of the trolley pole are fixed the safety fuses.

K is the conductor leading down along the trolley pole and making contact with K′ with the conductor $K^2$ and the fuse wire $K^3$, which latter leads to the conductor $K^4$ from which leads the conductor $K^5$ down to the car. The conductor $K^2$ leads to the block $K^6$, which is separate from but opposed to the block $K^7$, whence leads the conductor $K^8$ to the fuse wire $K^9$, which in turn is connected with the conductor $K^4$.

L is a circuit closing plug normally at rest in an aperture in the upper side of the trolley pole but adapted to be inserted in the aperture M, and thus to bring the two blocks $K^6$ and $K^7$ in circuit. The trolley pole G is of a length a trifle less than the width of the car. Each of the trolley poles is placed at the side of the car.

The main track is indicated by the letter N, and the branch track by the letter O, and the two curves respectively by the letters O′ $O^2$.

P is the main trolley wire having a branch, P′, to correspond to the curves O′ and the branch track O; and $P^2$ is a branch trolley wire leading backward along the curve $O^2$.

The use and operation of my invention are as follows: The trolley pole socket in active use is held by friction in a vertical position, but if the trolley is caught by some obstruction the socket will be tipped over as indicated in Fig. 2 and the continuing motion of the car will have the effect of drawing the plunger H, together with the trolley pole and trolleys, from the socket, thus cutting the car out of circuit but doing no other injury. The trolley pole is therefore self contained or complete and need only be inserted in the socket to be in operative position or to be withdrawn from the circuit for removal. The main grooved trolley is provided with an associate having a smooth surface so that in passing over switches and the like, and around curves, and across insulation points and lower obstructions, the conductor will likewise be in circuit. If one trolley is forced downwardly by such obstruction, the other will be thrown upwardly. In going around the curves the cylindrical surfaced wheel serves to assist in keeping the trolley from jumping the track. When the trolley is to be reversed, the pole, being of the length described, and swiveled in its socket, can be depressed to a horizontal plane and then carried around to an angle of one hundred and eighty degrees across and over the top of the car so as to bring it to the opposite position. The blocks $K^6$ and $K^7$ are normally disconnected and the current flows through the fuse wire $K^3$ and thence to the car. But if this fuse wire be blown out, then the other fuse wire can be brought into circuit by simply plugging in between the blocks $K^6$ and $K^7$. The fuse wire $K^9$ is preferably heavier than the fuse wire $K^3$. It is desirable to have the trolley pole at the side of the car on account of the crowded condition of the mines, and the small space available for trolley wires, &c.; but this would necessitate two main trolley wires if but one pole were used, or else it would necessitate dispensing with the use of curves such as $O'$ and $O^2$. If, now, the car is moving in the direction indicated by the arrow in Fig. 6 and passes out on to the branch track O, the trolley will still remain associated with the trolley wire $P'$. If, now, the motorman in returning from this branch O on to the main track N desires to move up the curve $O^2$, he will find when his motor car has returned to the main line that the trolley pole is on the opposite side of the track from its former position, since the motor has been reversed; and in this case, he dispenses with the trolley up to that time used and employs the trolley pole on the opposite side of the car. In electric locomotives or motor cars for mining machine work, great difficulty is experienced with many of the simplest actions of the car on account of the contracted passage way through which the cars must move, and also on account of the great desirability of economizing space and securing safety. There is also great difficulty experienced by the operator in getting access to the various parts of the apparatus while the car is filling up the passage way or lead. The several devices here set out as of my invention are largely intended to obviate these difficulties.

I claim—

1. The combination of a trolley pole with a socket therefor and means for securing said socket to the car by a pivoted and frictional contact.

2. The combination of a trolley pole with a socket therefor, the two swiveled together by means of a plunger on the trolley pole, adapted to pass within the socket, and a spring in the plunger connected with the end of the trolley pole so as to hold the latter to its work.

3. The combination of a mining motor car with a trolley pole socket secured to the side thereof and a trolley pole swiveled in said socket and pivoted so as to move in a vertical plane, said trolley pole of a length less than the width of the car.

4. The combination with a trolley pole, of two separate trolley wheels, one in front of the other, one of said trolleys being grooved and the other having a cylindrical surface, substantially as described.

5. The combination with a trolley pole, of two separate trolley wheels, one in front of the other, the forward one having a cylindrical surface and the rear one being grooved, substantially as described.

6. The combination with a trolley pole, of two separate trolley wheels, in line with each other, the front wheel being smaller than the rear wheel, and one of such wheels being grooved and the other cylindrical substantially as described.

7. The combination of a trolley pole with two trolleys thereon, one grooved and the other provided with a cylindrical surface, the two trolleys placed at the ends of a part pivoted midway on the end of the pole.

8. The combination with a trolley pole, of two separate trolley wheels in line with each other, the front wheel being smaller than the rear wheel and having a cylindrical surface and the rear wheel having a grooved surface.

9. The combination with a mining motor car, of two trolley poles secured one to each side of the car outside of the lines of the car body, substantially as described.

10. The combination of a mining motor car with two trolley poles secured one on each side thereof and trolley wires placed at one side of the track in part of the system, and supplementary trolley wires placed at the opposite sides of the track through part of the system.

ELMER A. SPERRY.

Witnesses:
FRANCIS W. PARKER,
WALTER J. GUNTHORP.